INVENTORS.
SHERMAN C. HETH
WARREN H. PRICE
BY
Lieber & Nilles
ATTORNEYS

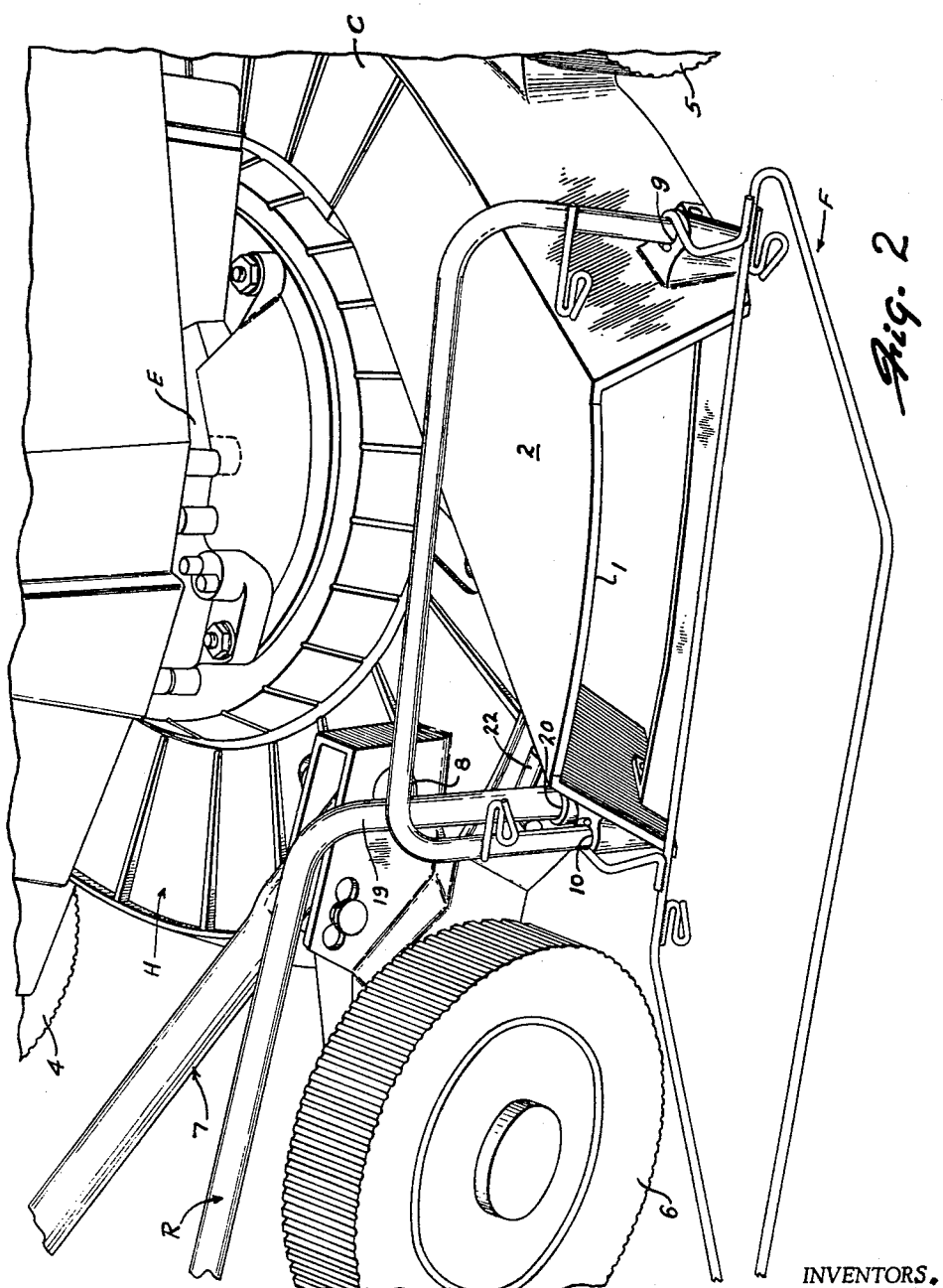

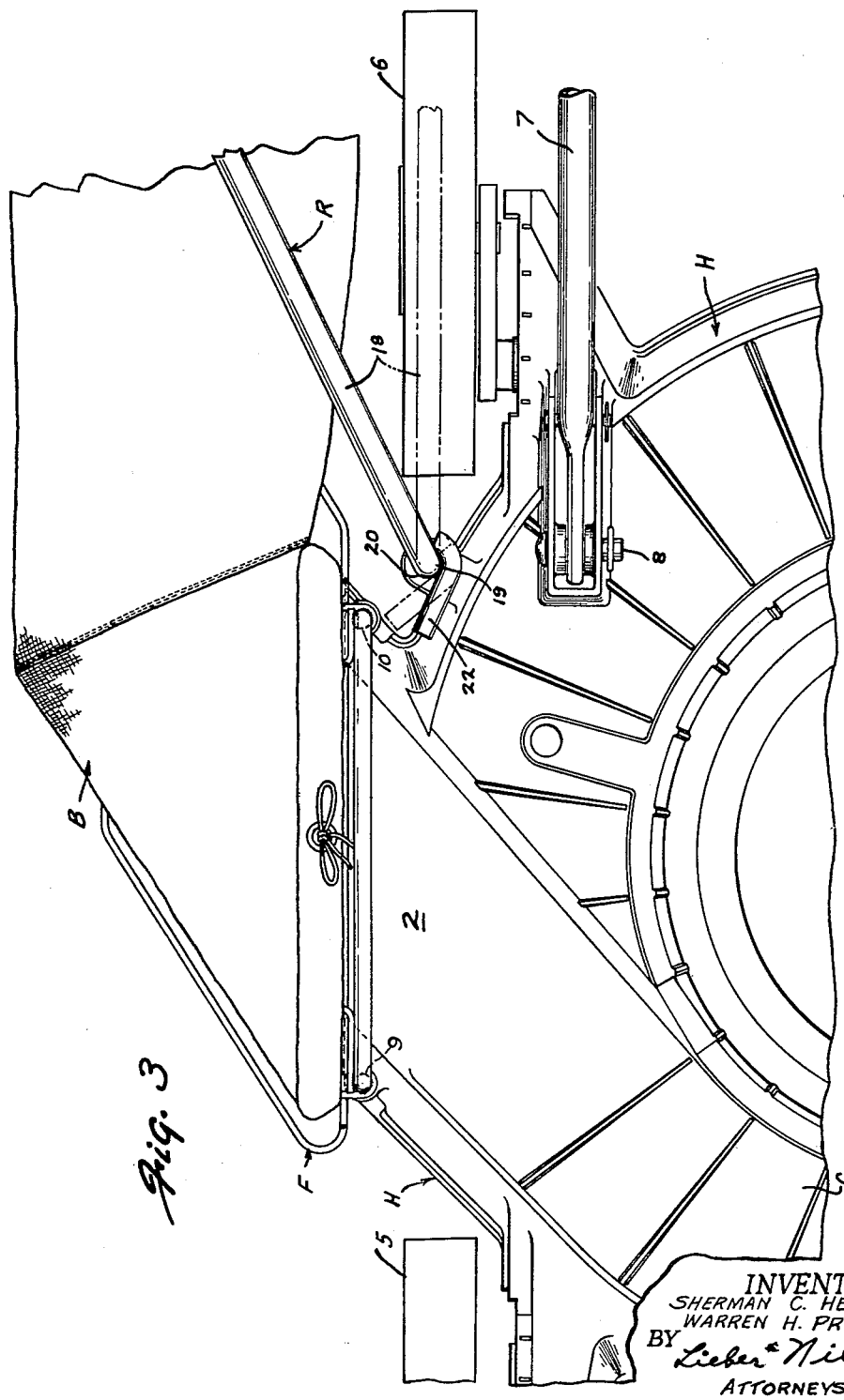

United States Patent Office 3,112,598
Patented Dec. 3, 1963

3,112,598
SUPPORT MEANS FOR ROTARY MOWER
BAGGING ATTACHMENT
Sherman C. Heth, Racine, and Warren H. Price, South Milwaukee, Wis., assignors to Jacobsen Manufacturing Company, Racine, Wis., a corporation of Wisconsin
Filed Sept. 24, 1962, Ser. No. 225,702
7 Claims. (Cl. 56—202)

This invention relates generally to rotary lawn mowers of the type having a rearwardly extending bag for catching clippings discharged by the mowers, and more particularly, this invention relates to an improved support means for the rear end of such a bag.

Prior art devices of this general character have usually utilized bag support rods which were attached to the rearwardly extending handle of the mower. Such supports, however, have not been entirely satisfactory for several reasons. For example, it is desirable for the handle of such a mower to be capable of vertical adjustment or "floating" and such has been restricted or impossible with the prior art supports because of the weight imposed on the handle. Furthermore, obstacles are frequently encountered alongside the mower, such as bushes, shrubs, buildings, or the like, and the bag, even though extending to the rear, often prevented mowing or maneuvering close to such obstacles, or resulted in damaged bags.

Accordingly, it is an object of the present invention to provide an improved support for a rearwardly extending catcher bag of a rotary mower which will overcome the above shortcomings of the prior art.

A more specific aspect of the present invention relates to a support of the above type which is attached directly to the mower housing and is pivotally mounted thereon about a generally vertical axis. As a result, the entire weight of the bag and its contents is carried by the mower proper and not the mower handle. Furthermore, this mounting provides a flexible support whereby the bag can swing laterally inwardly to clear obstacles at that side of the mower, and then return to its normal operating position.

The improved bag support of the present invention also furnishes complete support for the bag along its length and thereby contributes to orderly and complete filling of the bag.

These and other objects and advantages will appear hereinafter as this disclosure progresses, reference being had to the accompanying drawings, in which:

FIGURE 2 is a perspective view of a portion of the mower shown in FIGURE 1, but taken from the side thereof and with certain parts removed for clarity;

FIGURE 3 is a fragmentary plan view of a portion of the mower.

Figure 1:
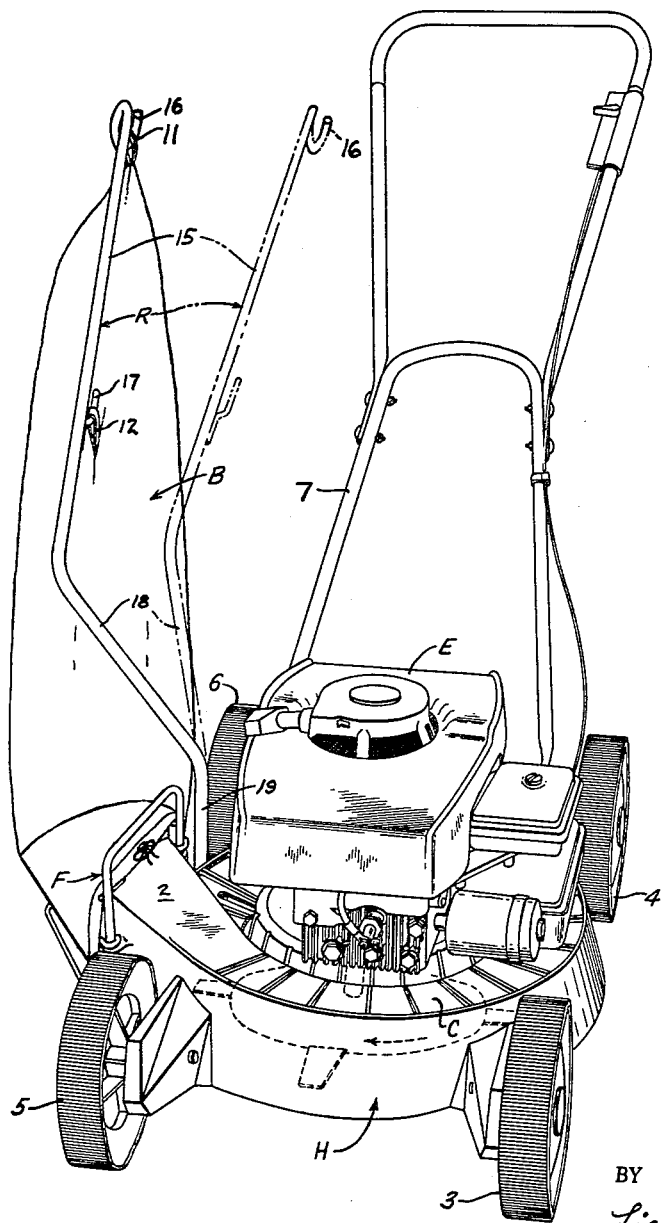
FIGURE 1 is a front perspective view of a mower embodying the present invention.

Referring in greater detail to the drawings, the rotary mower includes a blade housing H of the inverted volute channel type having an ever-increasing cross-sectional area which terminates in a discharge opening 1. The terminal or discharge end portion 2 of the channel C is directed rearwardly and laterally and acts to cause the clippings and other debris to be forcibly discharged in that general direction.

An internal combustion engine E is mounted on top of the housing and drives the blade assembly (not shown) located within the housing.

Ground wheels 3, 4, 5, and 6 maintain the housing at a constant attitude to the ground over which the mower traverses.

A rearwardly extending operator's handle 7 is pivotally attached at two laterally spaced locations adjacent the rear end of the housing, such as by means of the horizontal pivot pins 8. If a more complete description of this handle, its mounting, or function is deemed either necessary or desirable, reference may be had to the copending U.S. application, Serial No. 225,700, filed September 24, 1962, entitled "Handle for Rotary Lawn Mowers," and which has been assigned to a common assignee along with this application. It is believed sufficient to say for purposes of this disclosure, however, that the handle should be free to "float," that is, swing vertically to a certain extent while the mower is in operation. This "float" permits the mower housing to closely follow the contour of the ground without causing vertical jerking movement to be imparted to the handle, and this float also minimizes any attempt by the operator to bear down on the handle and thereby inadvertently vary the cutting height by raising the front side of the mower. In addition, the handle should be capable of being freely moved to any one of a number of selected operating heights to accommodate operators of different heights. The handle should furthermore be capable of unencumbered swinging to a vertical storage position.

The present invention is utilized with a rotary mower having a grass catching bag B extending rearwardly from and in communication with the discharge opening of the housing.

This flexible bag is secured to the housing H by the frame F around which its open front end is secured, and which frame is quickly attachable to the housing by being inserted in the spaced openings 9 and 10. The bag then extends laterally and rearwardly, being generally parallel to the direction of normal travel of the mower.

If a more complete description of the bag, mower housing H, or frame F is thought to be necessary or desirable, reference may be had to the copending U.S. application, Serial No. 225,699, filed September 24, 1962, entitled "Rotary Power Mower and Bagging Attachment Therefor" and which has been assigned to an assignee common with the present application.

The rear end of the bag has a loop 11 sewn at its upper side, and another loop 12 is secured to the top side of the bag and intermediate the length thereof.

The bag support rod R provided by the present invention includes a rear portion 15 which extends rearwardly and upwardly in the normal operating position shown by the full lines in FIGURE 1. A pair of hooks 16 and 17 are secured by welding at spaced locations along portion 15, hook 16 being located at the rear end of the rod. These hooks 16 and 17 are engageable by the respective loops 11 and 12 of the bag and support the bag along its entire length to thereby contribute to orderly and complete filling of the bag.

The rod R also includes an intermediate portion 18 which extends generally laterally and rearwardly so that rear portion 15 is laterally offset from the mower as shown best in FIGURE 1. This permits portion 15 to support the bag not only at its rear end, but also intermediate the length of the bag. As a result, the bag does not collapse or sag, but instead the material is blown to the rear of the bag, and filling of the bag commences at its rear end and progresses forwardly. Complete filling of the bag is thereby assured.

The rod also includes a front, vertical portion 19 which is inserted in a vertical opening or socket 20 formed at the side of the housing. The rod thus pivots about this vertical end as an axis and can swing, together with the bag, to a laterally inward position as indicated by the broken lines in FIGURE 1.

Consequently, obstructions encountered at that side of the mower can be circumvented by the bag swinging inwardly out of the way. The bag is thereby prevented from being torn or damaged, and maneuverability is enhanced.

Outward swinging of the rod beyond the normal position is prevented by the stop means 22 located functionally between the rod and housing. More specifically, a short bar 22 is welded to the rod and extends laterally outwardly therefrom where its free end contacts the housing to prevent further outward swinging from the normal position.

In accordance with the present invention, support means have been provided for supporting the bag along its length and which transmits the weight of the bag and its contents to the mower housing. In this manner, no weight is placed on the operator's handle as in some prior art devices, and the handle is free to float or be adjusted as above described.

In addition, the mounting of the handle is such that it can pivot relative to the housing and about a generally vertical axis, within limits, to prevent bag damage and enhance maneuverability.

Various modes of carrying out the invention are contemplated as being within the scope of the following claims particularly pointing out and distinctly claiming the subject matter which is regarded as the invention:

1. In combination with a rotary power mower having a blade housing and grass catching bag with an inlet end supported by the housing and extending rearwardly therefrom, a support rod extending rearwardly in a normal operating position from said housing and adapted at its rear end to support the rear end of said bag, said rod having a front end pivotally mounted on said housing about a generally vertical axis whereby said rod and bag can swing laterally inwardly relative to said housing.

2. In combination with a rotary power mower having a blade housing and grass catching bag with an inlet end supported by the housing and extending rearwardly therefrom, a support rod extending rearwardly in a normal operating position from said housing and adapted at its rear end to support the rear end of said bag, said rod having a front end pivotally mounted on said housing about a generally vertical axis whereby said rod and bag can swing laterally inwardly relative to said housing, and stop means between said rod and said housing for preventing lateral outward swinging of said rod beyond said normal operating position.

3. In combination with a rotary power mower having a blade housing and grass catching bag with an inlet end supported by the housing and extending rearwardly therefrom, a support rod extending rearwardly from said housing and adapted at its rear end to support the rear end of said bag, said rod at its front end having a pivot connection with said housing for permitting laterally inward swinging of said rear end of said rod and bag relative to said housing, and stop means between said rod and said housing for limiting lateral outward swinging of said rod.

4. In combination with a rotary power mower having a blade housing and grass catching bag with an inlet end supported by the housing and extending rearwardly therefrom, a support rod extending laterally outwardly and rearwardly from said housing, means at spaced locations along said rod for supporting said bag intermediate its length and at the rear end thereof, said rod having a generally vertical front end pivotally mounted on said housing about a generally vertical axis whereby said rod and bag can swing laterally inwardly relative to said housing.

5. In combination with a rotary power mower having a blade housing and grass catching bag with an inlet end supported by the housing and extending rearwardly therefrom, a support rod extending laterally outwardly and rearwardly from said housing, means at spaced locations along said rod for supporting said bag intermediate its length and at the rear end thereof, said rod having a generally vertical front end pivotally mounted on said housing about a generally vertical axis whereby said rod and bag can swing laterally inwardly relative to said housing, and stop means between said rod and said housing for limiting lateral outward swinging of said rod.

6. In combination with a rotary power mower having a blade housing and grass catching bag with an inlet end supported by the housing and extending rearwardly therefrom, a support rod extending generally rearwardly from said housing, said rod having a vertical front end pivotally mounted about a vertical axis on said housing, said rod also having an intermediate portion extending generally laterally outwardly from said housing, said rod also having a rearwardly extending rear portion, means at spaced locations on said rear portion for supporting said bag at spaced locations along its length, whereby said rod and bag can swing laterally inwardly relative to said housing.

7. The combination set forth in claim 6 including stop means between said rod and housing to limit lateral outward swinging of said rod.

References Cited in the file of this patent
UNITED STATES PATENTS

| | | |
|---|---|---|
| 2,855,744 | Phelps | Oct. 14, 1958 |
| 2,973,614 | Horner et al. | Mar. 7, 1961 |
| 3,047,998 | Leader et al. | Aug. 7, 1962 |